UNITED STATES PATENT OFFICE 2,535,636

HYDROXYBENZENESULFONAMIDOTRIAZINES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,823

3 Claims. (Cl. 260—249.6)

This invention relates to new and useful sulfonamides and to methods of preparing the same.

It has been discovered that certain p-hydroxybenzenesulfonamidotriazines possess unexpected anti-viral activity, particularly in the neurotropic virus diseases and may, therefore, become important drugs in the treatment of these and related diseases. The new compounds of the present invention may be represented by the general formula

in which R represents hydrogen or an aliphatic, aralkyl or heterocyclic radical, Triz represents a triazine radical attached to the amide nitrogen by a carbon in the heterocyclic ring and R' represents hydrogen or an acyl group. The triazine radical may bear one or more substituent radicals at the remaining positions such as alkyl, aryl, aralkyl, chloro, amino, substituted amino radicals and the like, or it may form a part of a condensed heterocyclic system.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included within the scope of the present invention.

The new p-hydroxybenzenesulfonamidotriazines may be prepared by several distinct methods, the more important of which will be described in the specific example which follows. The preferred method is by the hydrolysis of a suitable ester of a p-hydroxybenzenesulfonamidotriazine under either acidic or alkaline conditions whereby the —OH group is formed in the reaction. These esters which have the general formula

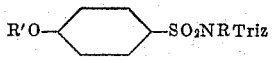

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an amino triazine in accordance with the following equation:

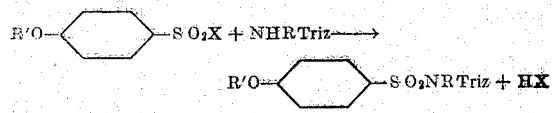

In the above R' is an acyl radical such as benzoyl, acetyl, furoyl, tosyl, carbethoxy or the like which may later be removed by hydrolysis. X is a halogen, preferably chlorine, but if desired fluorine or bromine. Triz is a triazine radical such as mentioned above attached by a carbon atom of the triazine ring.

To prepare intermediates in which R is an organic radical of the kind mentioned above, secondary amines such as 2-N-(beta-hydroxyethyl)-amino-triazine, 2-(N-methylamino) triazine and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group to R'O— to HO— can be effected over a wide range of conditions. The temperature for the hydrolysis may range from about 0° to 150° C. with the preferred temperatures being between 50° and 100° C. but this may vary with the nature of the compound being hydrolyzed. Sodium hydroxide at a concentration of approximately 10% and in slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O—, to HO—, can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C. the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-amino-benzenesulfonamidotriazines. This process involves diazotization of the p-amino-group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of representative p-hydroxybenzenesulfonamidotriazine in the following example. All parts are by weight unless otherwise indicated.

27 parts of 2-sulfanilamido-4,6-diamino-1,3,5-triazine (Anderson, Faith, Marson, Winnek and Roblin, J. Am. Chem. Soc. 64, 2902 (1942)) is dissolved in 540 parts by volume of 1.3 N sulfuric acid. The mixture is cooled to 5° C. and a solution of 1 N sodium nitrite is added dropwise until a permanent spot on starch-potassium iodide test paper is obtained. About one mole equivalent of nitrite is absorbed. The mixture is allowed to warm slowly to room temperature and then added slowly to 300 parts of hot water (approx. 90° C.). It is then heated until all of the diazo is decomposed, which takes about five minutes, given a treatment with decolorizing charcoal, clarified and cooled to approximately 5° C. A tan crystalline precipitate is formed, which is collected and reprecipitated from alkaline solution with the aid of decolorizing charcoal and sodium hydrosulfite. The product obtained, N-(4,6-diamino-1,3,5-triazin-2-yl)-1-phenol-4-sulfonamide, does not melt below 350° C.

Analysis calcd. for $C_9H_{10}O_3N_6S \cdot 2H_2O$:

|  | C | H | N | S |
|---|---|---|---|---|
| Calculated | 34.0 | 4.44 | 26.4 | 10.1 |
| Found: |  |  |  |  |
| (1) | 33.9 | 4.77 | 26.0 | 11.3 |
| (2) | 33.7 | 4.78 | 26.4 | 11.4 |

In accordance with the above methods, other p-hydroxybenzenesulfonamido triazine may be prepared, such as:

N - (5 - phenyl - 6 - phenylimino - 1,3,5 - triazin-2-yl)-1-phenol-4-sulfonamide N - (5,6 - diphenyl - 1,2,4 - triazin - 3 - yl) - 1-phenol-4-sulfonamide N - (4 - piperidyl - 6 - methyl - 1,3,5 - triazin - 2-yl)-1-phenol-4-sulfonamide N - (4 - hydroxy - 6 - phenyl - 1,3,5 - triazin - 2-yl)-1-phenol-4-sulfonamide 2,4 - di(4 - hydroxybenzenesulfonamido) - 6-phenyl-1,3,5-triazine using as intermediate the appropriate sulfanilamidotriazines.

The above compounds and others can also be prepared by the hydrolysis of the para-acyloxybenzenesulfonamidotriazines as mentioned in the above specification.

What we claim is:

1. Compounds having the general formula:

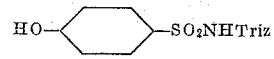

where Triz is a 1,3,5-triazinyl radical being attached to the amide nitrogen by a carbon atom of the triazinyl ring, and salts of such compounds.

2. N - (4,6 - diamino - 1,3,5 - triazin - 2 - yl)-1-phenol-4-sulfonamide.

3. In the process of preparing N-(4,6-diamino-1,3,5-triazin-2-yl)-1-phenol-4-sulfonamide the steps which comprises diazotizing N - (4,6 - diamino - 1,3,5 - triazin - 2 - yl) - sulfanilamide, decomposing the resultant diazo compound at a temperature below 150° C. and recovering the N - (4,6 - diamino - 1,3,5 - triazin - 2 - yl) - 1-phenol-4-sulfonamide.

MARTIN E. HULTQUIST.
ALOYSIUS J. BRYANT,
*Administrator of Estate of Yellapragada Subba-Row, deceased.*

REFERENCES CITED

The following references are of record in the file of this patent:

UNITED STATES PATENTS

| Number | Name | Date |
|---|---|---|
| 2,407,177 | Roblin | Sept. 3, 1946 |

OTHER REFERENCES

Billon Biologie Medicale, vol. 27, Supplement, 1936, p. 84.

Kermack et al.: J. Chem. Soc., London (1939), pp. 608–610.